United States Patent [19]
Noguchi et al.

[11] 3,974,818
[45] Aug. 17, 1976

[54] INTERNAL COMBUSTION ENGINE

[75] Inventors: Masaaki Noguchi, Nagoya;
Masaharu Sumiyoshi, Toyota;
Yukiyasu Tanaka, Okazaki; Taro Tanaka, Chiryu, all of Japan

[73] Assignee: Nippon Soken, Inc., Nishio, Japan

[22] Filed: Jan. 17, 1974

[21] Appl. No.: 434,216

[30] Foreign Application Priority Data

| | | |
|---|---|---|
| Jan. 22, 1973 | Japan | 48-9748 |
| Feb. 27, 1973 | Japan | 48-23919 |
| Mar. 8, 1973 | Japan | 48-27277 |
| Apr. 3, 1973 | Japan | 48-38467 |
| Oct. 31, 1973 | Japan | 48-123227 |

[52] U.S. Cl. ............................ 123/32 SP; 123/127; 123/32 ST
[51] Int. Cl.² ................... F02B 19/10; F02B 19/16
[58] Field of Search ........... 123/32 ST, 32 SP, 75 B, 123/191 S, 191 SI

[56] References Cited
UNITED STATES PATENTS

| | | | |
|---|---|---|---|
| 1,998,785 | 4/1935 | Mock | 123/75 B |
| 2,799,257 | 7/1957 | Stumpfig | 123/32 SP |
| 3,230,939 | 1/1966 | Goossak | 123/32 SP |
| 3,270,721 | 9/1966 | Hideg | 123/32 ST |
| 3,283,751 | 11/1966 | Goossak | 123/32 ST |
| 3,763,834 | 10/1973 | Geiger | 123/32 SP |
| 3,878,826 | 4/1975 | Date | 123/32 SP |

FOREIGN PATENTS OR APPLICATIONS

| | | | |
|---|---|---|---|
| 1,212,546 | 11/1970 | United Kingdom | 123/32 ST |

*Primary Examiner*—Charles J. Myhre
*Assistant Examiner*—Ronald B. Cox
*Attorney, Agent, or Firm*—Cushman, Darby & Cushman

[57] ABSTRACT

A stratified internal combustion engine has a trap chamber for rich mixture having suction and discharge apertures communicating the trap chamber with the principal combustion chamber. A separating wall is provided between the suction and discharge apertures to divide a portion of the trap chamber into two spaces or pockets, one communicating with the suction aperture and the other communicating with the discharge aperture, for thereby facilitating the introduction of rich mixture into the trap chamber and scavenging the residual gases in the trap chamber and improving the trapping effect of the trap chamber with a resultant improvement in stratified combustion in the engine.

18 Claims, 14 Drawing Figures

INTERNAL COMBUSTION ENGINE

BACKGROUND OF THE INVENTION

1. FIELD OF THE INVENTION

The present invention relates to an internal combustion engine which is intended to reduce the amount of harmful exhaust gases which give rise to public pollution.

2. DESCRIPTION OF THE PRIOR ART

It has been known that the amount of the harmful gaseous combustion products, such as nitrogen oxides ($NO_x$), carbon monoxide (CO) and hydrocarbon (HC), exhausted by an internal combustion engine is closely related to the air-fuel ratio of air-fuel mixture supplied to the engine for combustion therein. It is also known that the combustion of air-fuel mixture at a large air-fuel ratio (i.e., lean mixture) reduces the amount of the harmful exhaust gases compared to an air-fuel mixture at a small air-fuel ratio (i.e., rich mixture). However, since the ignitability of the air-fuel mixture by a spark plug is very limited by the air-fuel ratio, it is impossible to produce ignition by the spark plug when the lean mixture is at an air-fuel ratio outside the limited range. Thus, in order to reduce harmful exhaust gases by means of the lean mixture combustion, some other means for igniting the lean mixture is required. It has been known that a stratified combustion system is one of the means for enabling the ignition of the lean mixture. The stratified combustion system has such an arrangement that a stratified rich mixture is formed and held adjacent the electrodes of a spark plug in the comnbustion chamber while a stratified lean mixture is formed and held in the other parts of the chamber, which is ignited by a torch jet produced by spark-ignition of the rich mixture.

In general, the stratified combustion can be effectively performed in a so-called "torch ignition engine" which comprises a main chamber for receiving the lean mixture, a divided or auxiliary combustion chamber for receiving the rich mixture and a spark plug having electrodes disposed in the auxiliary combustion chamber. The achievement of stratified combustion is due to the fact that the division of a combustion chamber into two chambers advantageously assures the stratification of the two kinds of mixtures. However, it will be apparent that, even in a torch ignition engine of such a structure, the achievement of stratified combustion depends generally upon the extent to which the two stratified mixtures are maintained. Namely, in order that the stratified combustion may accomplish its best performance, it must be assured that an ignitable rich mixture be held within the divided combustion chamber while a lean mixture at an intended air-fuel ratio is held within the main chamber.

A typical torch ignition engine of the prior art is provided with a divided combustion chamber having a suction aperture for the flow of rich mixture thereinto and an additional intake valve solely for use with the divided chamber. The engine is so designed that the additional intake valve is opened during the suction stroke to allow the rich mixture to be directly introduced into the divided combustion chamber. The additional intake valve, however, inevitably complicates the cylinder head of the engine with a corresponding increase in the cost of manufacture of the engine.

U.S. Pat. No. 3,382,850 shows a torch ignition engine which does not require any additional valve for use only with a divided chamber. The engine, however, is not of the type that a rich mixture is directly introduced into its divided combustion chamber during a suction stroke but is of a design that the rich mixture is introduced into the divided chamber during the compression stroke. The divided combustion chamber is simply provided with a single or a plurality of discharge apertures opened to the main chamber. The discharge aperture or apertures are disposed at a substantial distance from the rich mixture supply passage. These facts lead to the problem that residual gases cannot be scavenged out of the divided chamber sufficiently to enable the chamber to be supplied with rich mixture of an amount that assures a reliable succeeding ignition, with a result that the engine does not assure a reliable continuous stratified combustion.

SUMMARY OF THE INVENTION

It is an object of the present invention to provide an internal combustion engine in which an amount of rich mixture is reliably introduced into an auxiliary combustion chamber or "trap chamber" during a suction stroke without a complicated cylinder head, thereby providing an improved stratified combustion.

It is another object of the present invention to provide an internal combustion engine in which the trap chamber is provided with a suction aperture, a discharge aperture and a separating wall disposed therebetween to improve the scavenging of residual gases from the trap chamber and thus to enable the rich mixture to be sufficiently introduced into the trap chamber to thereby assure an improved, reliable and controlled combustion.

A further object of the present invention is to provide a multi-cylinder internal combustion engine which includes rich mixture supply passages for respective cylinders each of which passages is closed when the piston of the associated cylinder is performing its strokes other than the suction stroke to thereby improve the distribution of the rich mixture to respective cylinders and to unify the air-fuel ratio of the rich mixture in each divided chamber to thereby improve the effect of stratified combustion therein.

According to the present invention, there is provided an internal combustion engine including a cylinder, a cylinder head cooperating with said cylinder to define a main chamber for the combustion of a lean mixture, an intake valve having a valve stem and a valve head connected thereto, a suction port for introducing lean and rich mixtures, a trap chamber for receiving the rich mixture and having at least one suction aperture through which the rich mixture is supplied into said trap chamber when said intake valve is opened, said trap chamber also having at least one discharge aperture communicating said trap chamber with said main chamber, a spark plug disposed in said trap chamber, and a suction passage for feeding the rich mixture, said passage having an open end disposed in said suction port so that the rich mixture is introduced therefrom into said trap chamber, wherein the improvement comprises means provided between said suction and discharge apertures of said trap chamber for partially dividing said trap chamber.

The partially dividing means may preferably be in the form of a wall which divides a part of the trap chamber into two spaces one of which is in communication with the suction aperture of the trap chamber and the other of which is in communication with the discharge aperture of the trap chamber. In some preferred embodiments of the invention, the separating wall extends from the bottom of the trap chamber inwardly toward the center of the trap chamber. In an alternative embodiment of the invention, the trap chamber is open-bottomed and the separating wall is disposed to divide the opening into two areas one of which forms the suction aperture of the trap chamber and the other of which forms the discharge aperture of the trap chamber. In all of the embodiments of the invention, the separating wall is operative to guide the flow of the rich mixture from the suction aperture to the discharge aperture via the electrodes of the spark plug, in other words, to prevent the direct flow of the rich mixture from the suction aperture to the discharge aperture to thereby hold an amount of the rich mixture within the trap chamber and to facilitate scavenging of the residual gases in the trap chamber whereby a fresh rich mixture exists in the vicinity of the electrodes of the spark plug at each time of ignition with a resultant reliable production of a torch jet which in turn reliably ignites the lean mixture contained in the main chamber.

The above and other objects, features and advantages of the present invention will be made apparent by the following description with reference to the accompanying drawings.

DESCRIPTION OF PREFERRED EMBODIMENTS

Figure 1B:
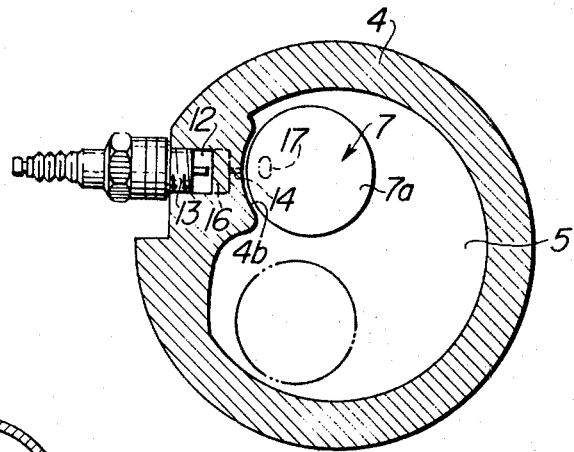
FIG. 1B is a fragmentary sectional view of the engine illustrated in FIG. 1A taken along line IB — IB in FIG. 1A.
Figure 1A:
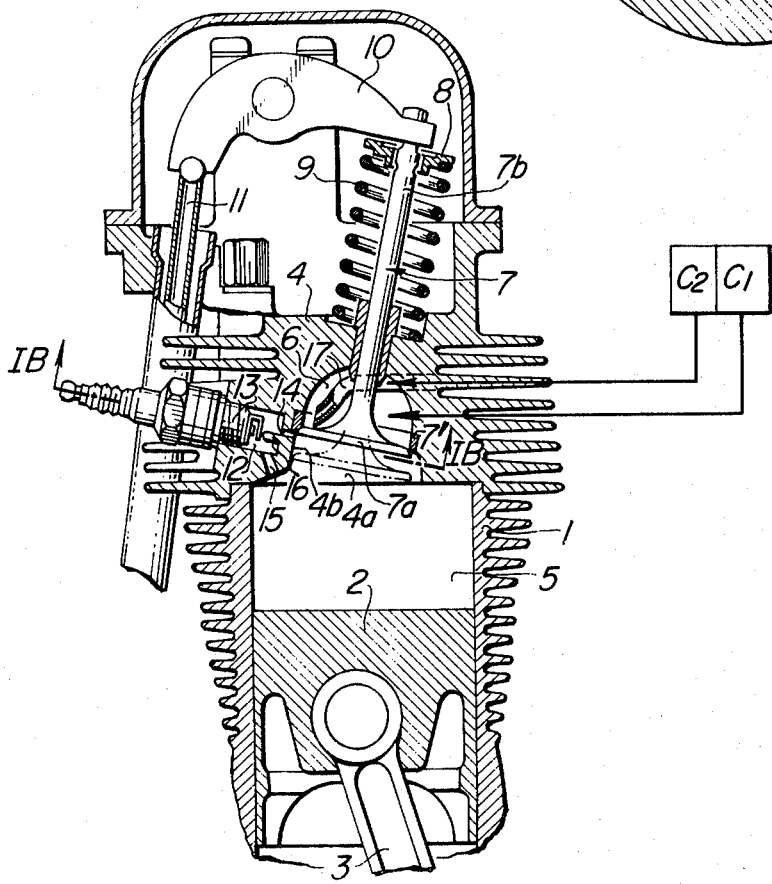
FIG. 1A is a partial sectional side view of a first embodiment of the internal combustion engine according to the present invention.

Referring first to FIGS. 1A and 1B, the internal combustion engine of the first embodiment of the invention has a cylinder 1 having an outer periphery provided with fins for ensuring the effective cooling of the engine. A piston 2 is mounted in the cylinder 1 and is drivingly connected to a crank mechanism (not shown) by means of a connecting rod 3 so that the reciprocal motion of the piston is converted by the crank mechanism into a rotary motion of a crank shaft (not shown) of the engine. A cylinder head 4 is mounted on the top (the upper end as viewed in FIG. 1A) of the cylinder 1. The surface of the cylinder head 4 facing the interior of the cylinder 1 cooperates with the inner peripheral surface of the cylinder and the top end face of the piston 2 to define a main chamber 5. On the surface of the cylinder head 4 facing the interior of the cylinder 1, there is formed a recess 4a defining a part of the main chamber 5. The cylinder head 4 also has its outer periphery formed with cooling fins similar to those on the cylinder 1.

A suction port 6 which is formed in the cylinder head 4 is communicated with the main chamber 5 and, particularly, with the recess 4a. An intake valve 7 and a valve seat 7' are provided between the suction port 6 and the combustion chamber 5. The intake valve 7 comprises a valve head 7a and a valve stem 7b. The valve head 7a is so positioned as to cooperate with the valve seat 7' while the valve stem 7b has an end portion extending from the cylinder head 4 outwardly beyond the top (the upper end as viewed in FIG. 1A) thereof. A spring retainer 8 is provided on the valve stem 7b adjacent to its outer end extremity. A spring 9 is mounted around the valve stem 7b and extends between the spring retainer 8 and the cylinder head 4. The valve stem 7b is operatively connected at its end to a rocker arm 10 which in turn is operatively connected to the crank shaft by means of a push rod 11 and a cam shaft (not shown) so that the valve 7 is reciprocated in accordance with the rotation of the crank shaft, i.e., the reciprocal motion of the piston 2, with a result that the valve head 7a is moved into and out of sealing engagement with the valve seat 7' to alternately close and open the suction port 6.

The suction port 6 is in communication with a main carburetor $C_1$ and an air cleaner (not shown) and cooperates to lead or introduce into the main chamber 5 a mixture (i.e., an air-fuel mixture charge at a relatively large air-fuel ratio) produced and adjusted by the main carburetor or air from the main character.

The engine is also provided with a trap chamber 12 in the form of a cylindrical bore formed in the cylinder head 4 and extending from the outer surface thereof a distance toward the recess 4a. A spark plug 13 is fitted into the bore 12 to close the outside end of the trap chamber. The trap chamber 12 is provided with a suction aperture 14 formed in the bottom wall of the chamber 12 and extending substantially in the axial direction thereof. The trap chamber 12 also has a discharge aperture 15 formed in the bottom wall of the chamber 12 and extending toward the interior of the cylinder 1 with an inclination to the axis of the trap chamber. The suction and discharge apertures 14 and 15 communicate the trap chamber 12 with the main chamber 5. More particularly, the suction aperture 14 is positioned on the side of the valve head 7a adjacent to the opening of the suction passage 17 in the suction port 6 when the valve 7 is opened as shown by broken lines in FIG. 1A. The discharge aperture 15 is located adjacent to the piston 2 at the top dead center and opens approximately toward the center of the upper surface of the piston. Stated in other words, the positional relationship between the valve head 7a, the suction aperture 14 and the discharge aperture 15 is such that the valve head 7a is located between the apertures 14 and 15 when the valve 7 is in its open position.

The main combustion chamber 5 has a side wall 4b provided by the part of the bottom wall of the trap chamber 12 between the suction and discharge apertures 14 and 15. The engine is so designed that at least a part of the peripheral edge of the valve head 7a is positioned in closely spaced relationship to the side wall 4b when the valve is opened. The side wall 4b has an arcuate concave cross-section substantially complementary to an adjacent part of the peripheral edge of the valve head 7a, as best shown in FIG. 1B. The arcuate concave side wall 4b extends in a direction substantially in parallel with the direction of the reciprocal movement of the valve 7 so that the valve head 7a is reciprocated with a part thereof being in closely spaced relationship with the side wall 4b.

The part of the trap chamber 12 adjacent to the main chamber 5 is divided into two spaces, one communicated with the suction aperture 14 and the other communicated with the discharge aperture 15, by a separating wall 16 extending from the bottom wall of the trap chamber 12 toward the spark plug 13, as will be seen in FIG. 1A.

A suction passage 17, which is connected at one end to an auxiliary carburetor $C_2$ and the air cleaner (not shown), opens at the other end adjacent to the suction aperture 14 of the trap chamber 12 and directly above the valve head 7a when the intake valve 7 is in its closed position. The suction passage 17 supplies to the trap chamber 12 a rich mixture produced and adjusted by the secondary carburetor $C_2$. For this purpose, the open end of the suction passage 17 is oriented toward the suction aperture 14 of the trap chamber 12. The suction passage 17 is operative to deliver the rich mixture in the suction port 6 immediately above the valve head 7a and, when the intake valve 7 is opened, cause the rich mixture to be introduced over the junction between the suction port 6 and the main chamber 5 and through the suction aperture 14 into the trap chamber 12. The intake valve 7 is operative to assist or facilitate the introduction of the rich mixture into the trap chamber 12 as will be fully described later.

In addition to the components described, the cylinder head 4 is further provided with exhaust port and valve which, however, are substantially the same as those of the conventional internal combustion engine and thus will not be described herein.

The operation of the engine with the aforestated structure and arrangement will be described hereunder. In the suction stroke of the piston 2, the valve 7 will be opened by means of the connecting rod 3, the crank shaft (not shown), push rod 11, rocker arm 10, etc. so that the valve head 7a is moved to a position between the suction aperture 14 and the discharge aperture 15, as shown by broken lines in FIG. 1A. Thus, the suction port 6 is communicated with the main chamber 5 and, at the same time, the suction passage 17 is allowed to communicate with the trap chamber 12 through the junction between the suction port 6 and the main chamber 5 and through the suction aperture 14. As the piston 2 is moved downwardly, a lean mixture is sucked through the suction port 6 into the main chamber 5. Simultaneously, the residual gases remaining in the trap chamber 12 are discharged mainly through the discharge aperture 15 from the trap chamber and sucked into the cylinder 1, with a result that the rich mixture delivered by the suction passage 17 is sucked from the suction port 6 into the trap chamber through the junction between the suction port 6 and the main chamber 5 and through the suction aperture 14. In other words, the residual gases remaining in the trap chamber 12 are allowed to be discharged therefrom through the discharge aperture 15 while the suction aperture 14 passes the rich mixture from the suction passage 17 and holds it in the trap chamber 12 in the suction stroke. The separating wall 16 is operative to facilitate the introduction of the rich mixture into the trap chamber 12 and hold the mixture therein. The reason for this is that the separating wall 16 partially divides the trap chamber 12 into two spaces or pockets, one directly communicated with the suction aperture 14 and the other with the discharge aperture 15, with a result that the residual gases and the rich mixture are caused to flow in a stratified fashion within the trap chamber, whereby the discharge of the residual gases through the discharge aperture 15 is advantageously carried out simultaneously with the introduction of the rich mixture through the suction aperture 14 into the trap chamber 12. Stated in other words, the separating wall 16 is operative to facilitate the scavenging of the residual gases from the trap chamber 12 and to eliminate a possibility that the residual gases are disadvantageously remained in the trap chamber 12 while the rich mixture is sucked through the suction aperture 14 into the trap chamber 12 and immediately flows out of the same. In addition, the separating wall 16 is also operative to guide and lead the rich mixture toward the electrodes of the spark plug 13 so that the electrodes are surrounded by a fresh rich mixture at each time of ignition with a result that the ignition by the spark plug is improved and reliably performed.

On the way of the rich mixture from the suction passage 17 into the suction aperture 14, the rich mixture flows past the junction between the suction port 6 and the main chamber 5. At this instance, the flow of the rich mixture is guided by the intake valve 7. More specifically, because the side wall 4b of the trap chamber 12 and the valve head 7a are so arranged as to dispose a part of the periphery of the valve head 7a in closely spaced relationship to the side wall 4b, as described above, the valve head 7a guides and leads the rich mixture from the open end of the suction passage 17 to the suction aperture 14 of the trap chamber 12. In addition, since the side wall 4b is designed to have a concave arcuate shape so that the side wall 4b extends circumferentially of the valve head 7a over an increased angular range in closely spaced relationship with the valve head 7a. As discussed previously, the flow of the rich mixture to places other than the suction aperture 14 is substantially avoided with an advantageous result that the rich mixture from the suction passage 17 is introduced at an improved rate through the suction aperture 14 into the trap chamber 12.

Incidentally, the rich mixture delivered from the suction passage 17 is mixed with a certain amount of lean mixture within the suction port 6 before the rich mixture is introduced into the trap chamber 12. Thus, the rich mixture received by the trap chamber 12 will be at an air-fuel ratio which is slightly larger than that of the rich mixture within the suction passage 17.

In the compression stroke, the intake valve 7 is returned by the spring 9 to a closed position in which the valve head 7a is urged into sealing engagement with the valve seat 7', as shown by solid lines in FIG. 1A, to shut off the communication between the suction port 6 and the main chamber 5. Thus, the lean mixture in the main chamber 5 is compressed as the piston is moved upwardly. As the lean mixture is compressed, a part of this mixture is introduced through the suction and discharge apertures 14 and 15 into the trap chamber 12 with a result that the rich mixture in the trap chamber is weakened or diluted and compressed. In this way, the rich mixture in the trap chamber 12 will be diluted appropriately so that the mixture in the trap chamber 12 is at an air-fuel ratio most suited for the ignition by the spark plug 13 at a most properly adjusted time of ignition.

When the thus diluted rich mixture in the trap chamber 12 is ignited by a spark between the electrodes of the spark plug 13 to be combusted therein, torch jets will spurt through the suction and discharge apertures 14 and 15 into the main chamber 5 with a result that the lean mixture within the main chamber 5, which mixture itself is so lean that it is not ignited by a conventional spark ignition, can be ignited by the torch jet to produce a complete combustion. After the combustion of the rich and lean mixtures, the engine performs its expansion stroke to complete a cycle of operation as in conventional four-stroke cycle engines.

A reliable operation of the engine will be assured by the following example: The lean mixture to be introduced from the suction port 6 into the main chamber 5 is at an air-fuel ratio of from 20 to 30; the rich mixture to be sucked from the suction passage 17 into the trap chamber 12 is at an air-fuel ratio of from 2 to 6; and the relative flow percentages of the rich mixture is from 5 to 15 % of the total flow of both mixtures.

The engine according to the present invention will achieve a stratified combustion with an advantageous result that harmful exhaust gases are reduced. Advantageously, the engine of the present invention does not require any additional intake valve for use with the trap chamber only. This makes it possible to stratify lean and rich mixtures without the use of a cylinder head of very complicated structure. The suction and discharge apertures 14 and 15 for the trap chamber 12 are operative to advantageously reliably facilitate the stratification of rich and lean mixtures within the combustion chamber, which leads to an improvement in the reduction in the production of harmful exhaust gases. The separating wall 16 provided between the suction and discharge apertures 14 and 15 for the trap chamber 12 further facilitates the trapping of rich mixture within the trap chamber 12.

Figure 2:
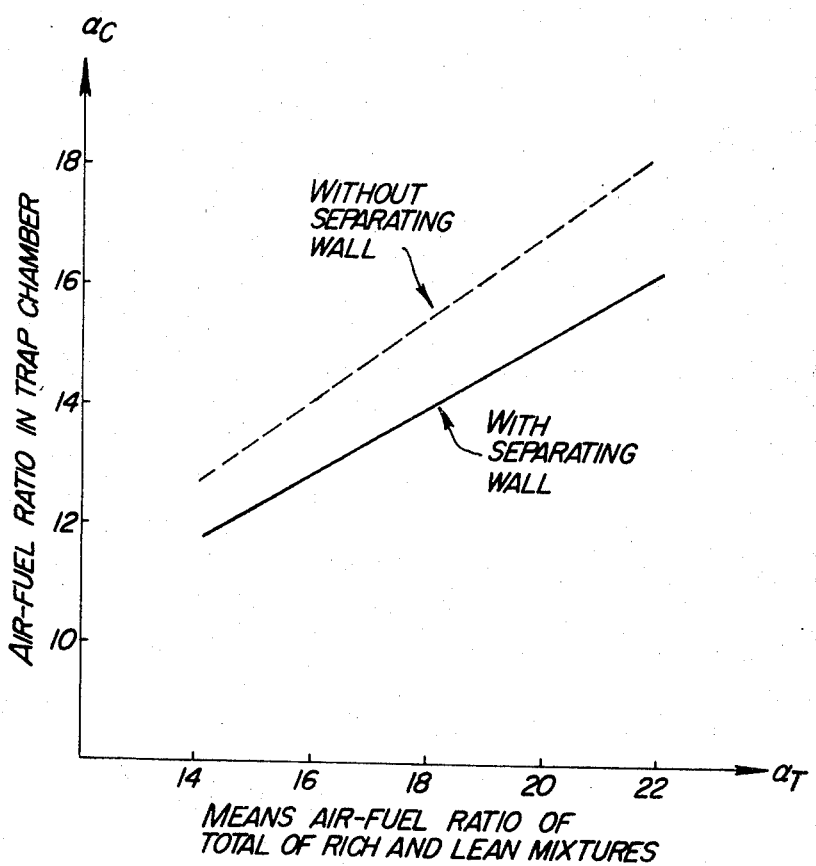
FIG. 2 is a graphical illustration of test results showing the advantageous effect of a separating wall provided in the engine according to the present invention.

With respect to the effect of the separating wall 16, the inventors have conducted tests to compare the air-fuel ratio obtained within the trap chamber 12 according to the present invention with the air-fuel ratio obtained within a similar trap chamber which is not provided with such a separating wall. FIG. 2 graphically illustrates the results of the tests, wherein the abscissa represents the mean air-fuel ratio $\alpha_T$ of the rich and lean mixtures while the ordinate represents the air-fuel ratio $\alpha_C$ obtained within the trap chamber just prior to ignition. The solid line in FIG. 2 shows the result of the test on the engine according to the present invention while the broken line illustrates the result of the test on the other engine without the separating wall. It will be apparent from the test results that the provision of the separating wall 16 in the trap chamber 12 is effective to trap within the trap chamber a mixture charge of air-fuel mixture at a richer air-fuel ratio $\alpha_C$ for the same mean air-fuel ratio $\alpha_T$; in other words, the separating wall 16 makes it possible to use a total charge at a leaner air-fuel ratio for the same air-fuel ratio $\alpha_C$ in the trap chamber 12. Thus, the separating wall 16 advantageously improves the stratified combustion and, thus, contributes to the reduction of harmful exhaust gases.

In the described embodiment of the invention, the trap chamber 12 is formed by boring the cylinder head 4. This design requires skilled machining operation. Particularly, it is very difficult to form the separating wall 16 in the case wherein the trap chamber 12 is formed by boring. The embodiments shown in FIGS. 3 to 5 have been designed to eliminate these difficulties. Each of the alternative embodiments utilizes a separate casing member which, when installed in an associated engine, is designed to define a trap chamber in the engine. It will be sufficient for an associated cylinder head to be formed therein with a simple bore or hole for detachably receiving the casing member.

Figure 3:
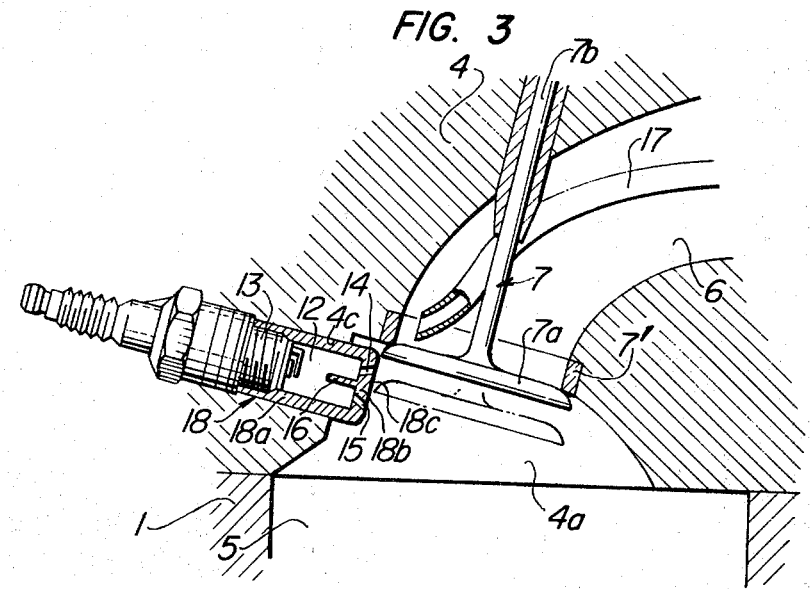
FIG. 3 is a fragmentary partial sectional view of a second embodiment of the internal combustion engine according to the present invention.

Referring particularly to FIG. 3, the engine of the embodiment shown therein has a cylinder head 4 which is provided with a bore 4c extending therethrough from the outer periphery to a main chamber 5. The bore 4c detachably or removably receives a generally cup-shaped casing 18 comprising a cylindrical portion 18a and a bottom 18b. The casing 18 defines therein a trap chamber 12 whose bottom 18b projects into the main chamber 5 so that a part of the peripheral edge of a valve head 7a of an intake valve 7, when opened, is positioned adjacent to an intermediate portion of the bottom 18b of the casing 18, as shown by broken lines in FIG. 3. A spark plug 13 is so disposed as to close an outer open end of the cylindrical portion 18a of the casing 18. In its bottom 18b, there are provided a suction aperture 14 and a discharge aperture 15. The suction aperture 14 is opened toward the suction port 6 with regard to the valve head when it is in its open position whereas the discharge aperture 15 is opened toward the opposite side thereof.

The casing 18 has a separating wall 16 provided on the bottom 18b between the suction and discharge apertures 14 and 15 and extending to the inside of the trap chamber, i.e., toward the spark plug 13. The outer surface of the bottom 18b of the casing 18 provides the main chamber 45 with a side wall portion 18c which preferably has an arcuate concave shape in cross-section (though not shown) similar to that of the side wall 4b in the preceding embodiment.

Figure 4:
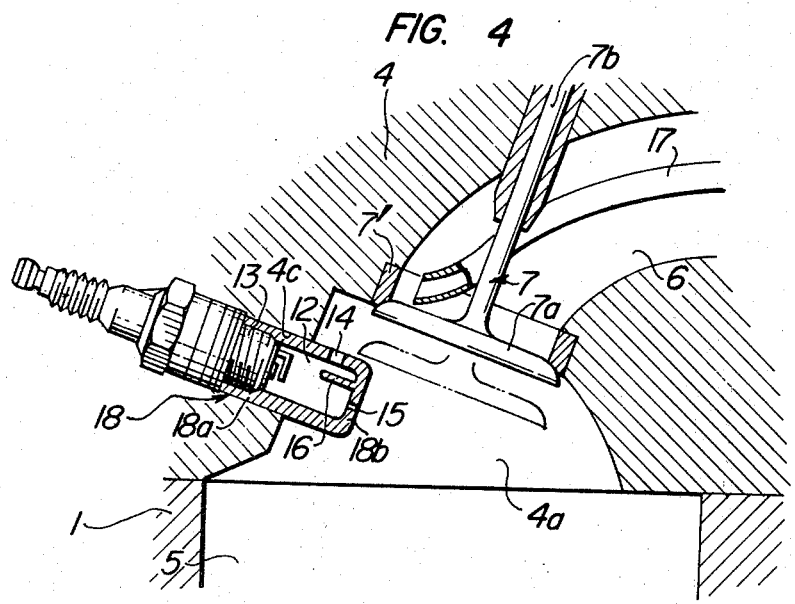
FIG. 4 is a fragmentary sectional view of a third embodiment of the internal combustion engine according to the present invention.

In the embodiment shown in FIG. 4, a trap chamber 12 defined by a casing 18 is downwardly displaced as compared with the position of the casing 18 in the embodiment shown in FIG. 3 and projects further into a main chamber 5 so that, when an intake valve 7 is opened, its valve head 7a is positioned adjacent to a bottom 18b of the casing 18, as shown by broken lines in FIG. 4. Correspondingly, a suction aperture 14 of the trap chamber 12 is formed in the cylindrical portion 18a of the casing 18 which comes adjacent to the peripheral edge of the valve head 7a in its open position while a discharge aperture 15 of the trap chamber 12 is formed substantially at the center of the bottom 18b of the casing 18. The trap chamber 12 is provided with a separating wall 16 formed on the bottom 18b of the casing 18 on the side of the discharge aperture 15 and extends into the inside of the trap chamber 12 beyond the suction aperture 14.

Figure 5:
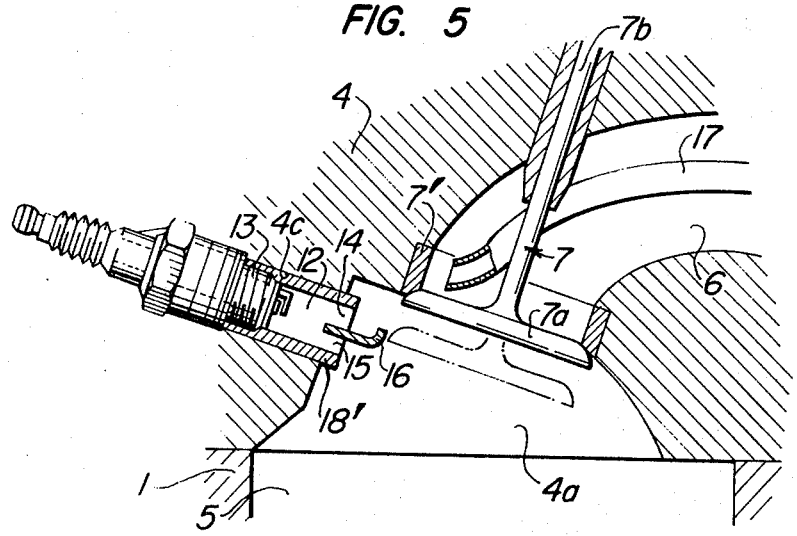
FIG. 5 is a fragmentary sectional view of a fourth embodiment of the invention.

The embodiment shown in FIG. 5 comprises a trap chamber 12 with its separating wall 16 extending into the chamber 12 as well as into a main chamber 5 beyond the end of a cylindrical or sleeve-like casing 18' which defines the trap chamber 12 therein and is detachably fitted into a bore 4c in a cylinder head 4. More specifically, the casing 18' has an open end at which the separating wall 16 is provided at the center of the opening and extends axially along the casing 18' to divide the opening into two openings, one of which forms a suction aperture 14 of the trap chamber 12 and the other of which forms a discharge aperture 15. The separating wall 16 has an end portion which is positioned and turned upwardly toward a suction port 6 so that a head 7a of an intake valve 7 when opened is positioned closely spaced thereto. The end surface of the separating wall 16 is preferably formed with an arcuate concave recess (though not shown) similar to the concave surface 4b in the first embodiment shown in FIG. 1B.

In each of the embodiments shown in FIGS. 3 to 5, it is possible to form with ease the separating wall 16 integral with the casing 18 or 18'. As the casing 18 or 18' is detachable from an associated cylinder head 4, it is possible to replace a casing 18 or 18' by other replacement casings. In addition, since the trap chamber 12 of each of the embodiments in FIGS. 3 to 5 has its end projecting into the main chamber 5 and provided with a suction aperture 14, it is assured that the rich mixture delivered from a suction passage 17 and flowing at a high velocity over the junction between the suction port 6 and the main chamber 5 (i.e., the gap between the intake valve 7 and the valve seat 7') can be introduced at that high velocity through the suction aperture 14 into the trap chamber 12. This advantageously increases the amount of rich mixture to be trapped by the trap chamber from the suction passage 17 and, in addition, improves the scavenging effect on the residual gases remaining in the trap chamber 12 with a resultant improvement in the ignitability thereof.

The embodiments described above are shown to have cylindrical trap chambers. The invention, however, is not limited to the described and illustrated shapes of the trap chambers and, in fact, may use a trap chamber of another shape such as spherical shape, for example. In the case where a trap chamber is defined by a casing member, it is generally difficult to provide the casing member with an arcuate concave recess complementary to an associated valve head. In such a case, such an arrangement may conveniently be employed that a part of the periphery of the valve head is positioned adjacent to the part of the casing between the suction and discharge apertures when the valve is in its open position.

Figure 6A:
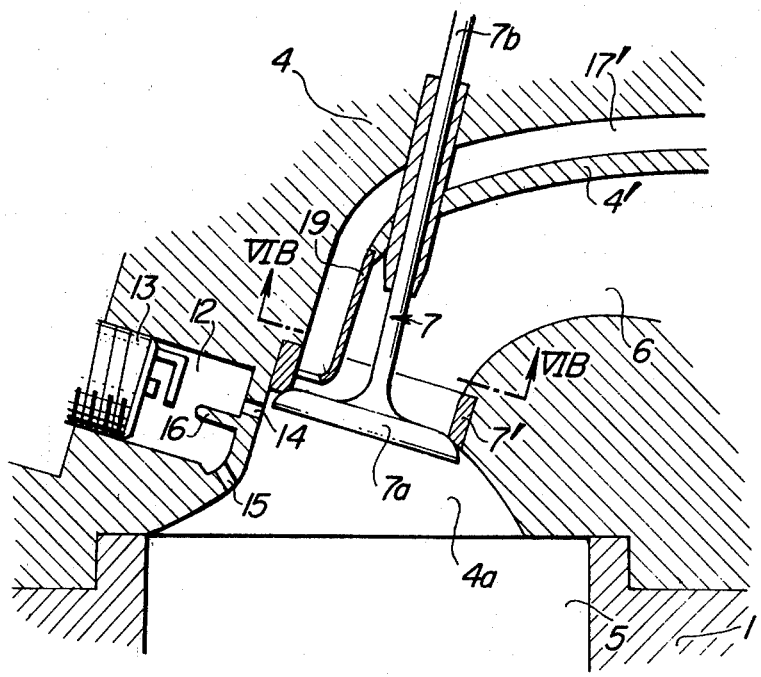
FIG. 6A is a similar view but illustrates a fifth embodiment of the internal combustion engine according to the present invention.
Figure 6B:
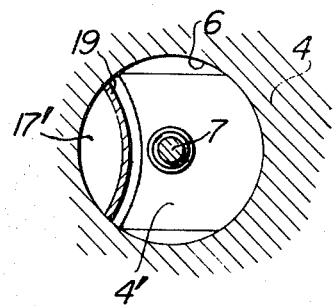
FIG. 6B is a fragmentary sectional view of the engine illustrated in FIG. 6A taken along line VIB — VIB in FIG. 6A.

The described embodiments have their suction passages 17 each in the form of a conduit disposed within a suction port 6. In the embodiment shown in FIGS. 6A and 6B, a suction passage 17' for introducing rich mixture is formed in a cylinder head 4 and separated from a lean mixture suction port 6 by a wall 4' formed integral with the cylinder head and by a partition plate 19 connected to the open end of the wall 4'. The partition plate 19 has its inner end slightly bent toward a suction aperture 14 of a trap chamber 12 which is defined by a bore in the cylinder 4.

Figure 7:
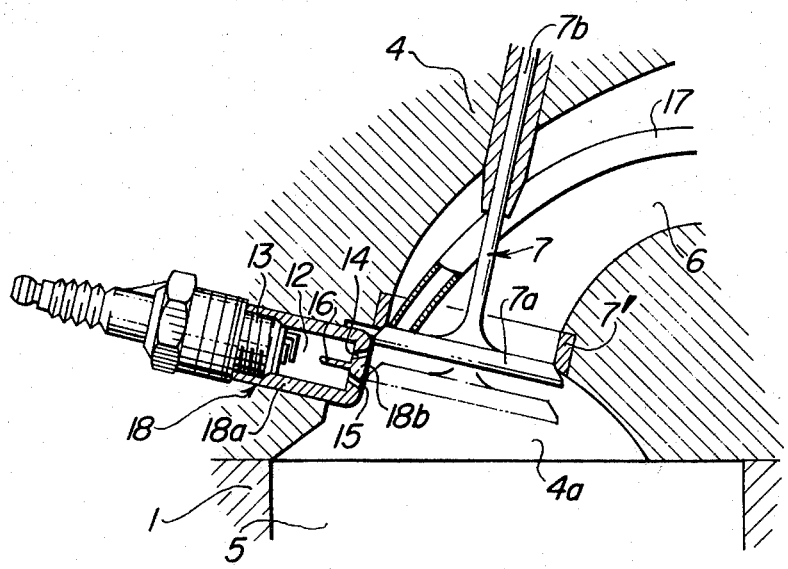
FIG. 7 is a fragmentary sectional view of a sixth embodiment of the internal combustion engine according to the present invention.
Figure 8A:
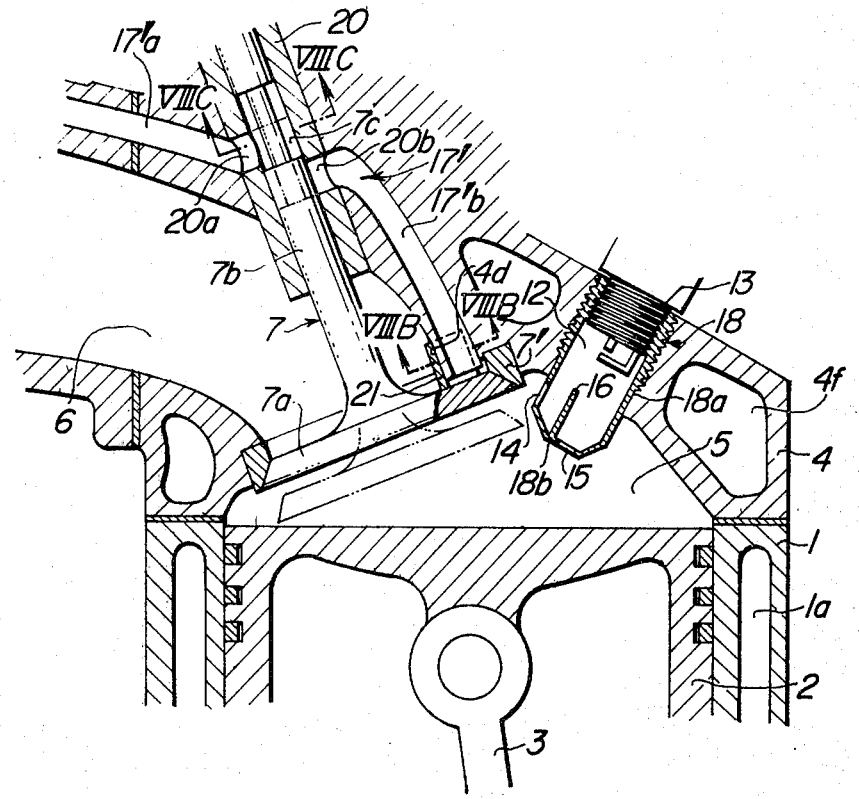
FIG. 8A is a fragmentary sectional view of a seventh embodiment of the internal combustion engine according to the present invention.

The embodiments shown in FIGS. 7 and 8A have the suction passages 17 for the rich mixture which are designed to be opened and closed by intake valves 7 in synchronism with the opening and closing of the suction ports 6 by the intake valves 7. This is achieved by valving the rich mixture passages either at their open ends (in FIG. 7 embodiment) or at their intermediate portions of the suction passage 17' (in FIG. 8 embodiment). These embodiments will be described in more detail hereunder.

Referring to FIG. 7, the rich mixture passage is in the form of a suction passage 17 disposed in a suction port 6. The suction passage 17 opens at an opening in the suction port which is adapted to contact with a part of the back face of a head 7a of an intake valve 7 which is disposed adjacent to a trap chamber 12 when the valve is closed. Accordingly, the inner open end of the suction passage 17 is opened and closed by the valve head 7a in synchronism with the opening and closing of the suction port 6 by the valve 7, respectively.

Figure 8B:
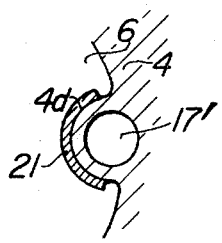
FIG. 8B is a fragmentary sectional view of the engine illustrated in FIG. 8A taken along line VIIIB — VIIIB in FIG. 8A.
Figure 8C:
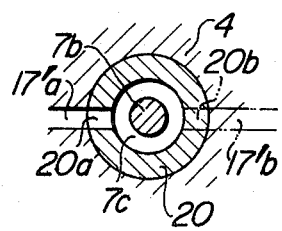
FIG. 8C is a fragmentary sectional view of the engine illustrated in FIG. 8A taken along line VIIIC — VIIIC in FIG. 8A.

Referring to FIGS. 8A, 8B and 8C, an intake valve 7 has a stem 7b which is formed into a shut-off valve for opening and closing a rich mixture passage 17' between its ends. The valve stem 7b slidably moves through a valve guide 20 in conventional manner. A part of the valve stem 7b of the valve 7 which extends within the valve guide 20 is of a reduced diameter, as seen in FIG. 8C, to provide an annular groove 7c which has a predetermined axial length. The valve guide 20 is formed therein with a pair of ports 20a and 20b which are positioned diametrically on opposite sides of the stem 7b and displaced axially such a distance that the communication between the ports 20a and 20b is shut off by the valve stem 7b of the intake valve 7 when it is in the closed position, as shown by solid lines in FIG. 8A, but the ports 20a and 20b are communicated by means of the annular groove 7c in the valve stem 7b when the intake valve 7 is moved to its open position, as shown by broken lines in FIG. 8A.

It will be apparent to those skilled in the art that the annular groove 7c is not necessarily required to extend completely around the periphery of the valve stem 7b. One of the pots 20a is communicated with an upstream part 17'a of a suction passage 17' while the other port 20b is communication with a downstream part 17'b of the suction passage 17'. The engine of the embodiment shown in FIG. 8A is water-cooled engine and thus has a cylinder 1 and a cylinder head 4 which are formed therein with water passages 1a and 4f, respectively.

The suction passages 17 and 17' in the embodiments shown in FIGS. 7 and 8 are closed during the strokes other than the suction stroke. This feature is particularly useful in multi-cylinder engines. It will be understood that, even if a cylinder of a multi-cylinder engine is being subjected to a stroke other than suction stroke, the suction port of the cylinder will be subjected to vacuum pressure if the piston of another cylinder is in its suction stroke. This is due to the fact that the suction stroke of the piston of the other cylinder produces a vacuum in the suction port of said the other cylinder which vacuum pressure in turn is transmitted to the suction ports of the first and another cylinders. Thus, if the suction passage 17 or 17' were always opened to an associated suction port 6, the rich mixture will be always continuously delivered from the suction passage 17 or 17' to an associated suction port under the vacuum pressure produced in the suction stroke of the piston in the associated cylinder and by succeeding suction strokes of the pistons in other cylinders, with a disadvantageous influence on the distribution of the rich mixture to every trap chamber and with an increase in the air-fuel ratio variation of every trap chamber. However, since the suction passages 17 and 17' of the embodiments of the invention are in fact closed during the strokes other than the suction stroke in one cylinder, the rich mixture is fed only to the cylinder or cylinders under the suction stroke, with the advantageous result that equal flow of the rich mixture is successively distributed to cylinders when they are brought in the suction strokes and that two stratified mixtures are surely formed in each cylinder during its suction and compression strokes because the rich mixture is not delivered to the suction ports of the cylinders during their strokes other than the suction stroke.

The embodiment shown in FIGS. 8A to 8C is provided with means for ensuring the introduction of the rich mixture from the suction passage 17' through a suction aperture 14 into a trap chamber 12. This means comprises a guide member of plate 21 provided on the part of the back face of the valve head 7a adjacent to the trap chamber 12 and extending substantially in parallel with the valve stem 7b. The guide plate 21 has an arcuate cross-section as shown in FIG. 8B. The cylinder head 4 is provided with a corresponding wall 4d having a cross-section substantially complementary to that of the guide plate 21. The guide plate 21 is in contact with the wall 4d and slidable thereon as the valve head 7a is reciprocated. The guide plate 21 has such a size that a part of the plate is still in contact with the wall 4d even when the guide plate 21 is moved down in the full opening of the valve 7. The guide plate 21 is not limited to an arcuate cross-section and may have any other convenient shape such as, for example, a hook-like shape in section. When the intake valve 7 is opened, the rich mixture delivered from the suction passage 17' is guided by the guide plate 21 and by the peripheral edge of the valve head 7a of the intake valve 7 toward the suction aperture 14 through which the rich mixture is introduced into the trap chamber 12.

Figure 9:
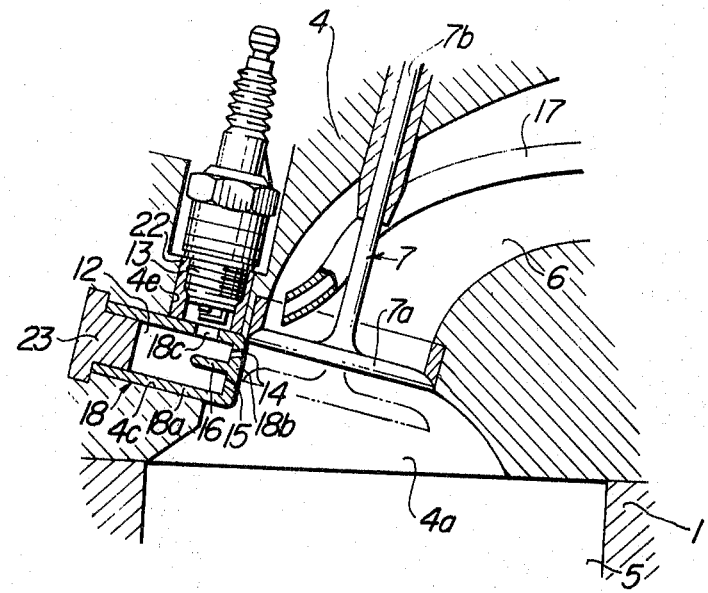
FIG. 9 is a fragmentary sectional view of an eighth embodiment of the internal combustion engine according to the present invention.
Figure 10:
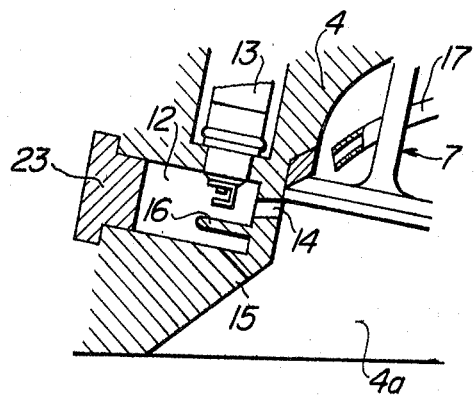
FIG. 10 is a fragmentary sectional view of a ninth embodiment of the invention.

The embodiment shown in FIGS. 9 and 10 provide engines in which electrodes of spark plugs are disposed adjacent to either suction apertures 14 of trap chambers 12 or discharge apertures 15 thereof. More specifically, the embodiment shown in FIG. 9 has a cylinder head 4 in which is formed a bore 4c for receiving or housing a casing 18 which defines a trap chamber 12 therein. The cylinder head 4 is also formed therein with a second bore 4e extending perpendicularly to the axis of the first bore 4c. The secnd bore 4e receives a sleeve 22 into which a spark plug 13 is screwed. The sleeve 22 defines therein a chamber which is communicated with the trap chamber 12 through an opening 18c formed in a cylindrical portion 18a of the casing 18. The opening 18c is so positioned that the chamber defined by the sleeve 22 is communicated with a part of the trap chamber 12 which is adjacent to the suction aperture 14 of the trap chamber 12. The bore 4e receiving the sleeve 22 is correspondingly positioned. The electrodes of the spark plug do not project into the trap chamber 12 but are housed in the sleeve 22.

The embodiment shown in FIG. 10 is similar to the embodiment in FIG. 9 with respect to the feature that a spark plug 13 has its electrodes disposed adjacent a suction aperture 14 of a trap chamber 12. With the FIG. 10 embodiment, however, the spark plug 13 has its electrodes extending into the trap chamber 12.

In both embodiments in FIGS. 9 and 10, the trap chambers 12 have outer open ends closed by caps or closure members 23 screwed into the trap chambers. In an alternative modification, the spark plugs 13 may be so positioned that the electrodes thereof are disposed adjacent to the discharge apertures 15 rather than the suction aperture 14.

With the embodiment shown in FIG. 9, since the electrodes of the spark plug 13 do not project into the trap chamber 12, the electrodes are advantageously prevented from being wetted by the rich mixture introduced into the trap chamber 12 through the suction aperture 14. In addition, the ignition energy of the initial combustion in the trap chamber is prevented from being scattered with an advantageous result that a stable flame kernel is reliably formed at each time of ignition. On the other hand, in the embodiment shown in FIG. 10, the electrodes of the plug 13 extend into the trap chamber 12 and are disposed substantially in alignment with the suction aperture 14 of the trap chamber 12. Thus, the plug electrodes are placed within a flow of fresh mixture flowing at a high velocity so that the flesh rich mixture are successively moved into contact with the electrodes with an improvement in the ignition.

It will be seen from the foregoing description that the internal combustion engine according to the present invention advantageously achieves stratified combustion to reduce the production of harmful exhaust gases with minor changes to the conventional internal combustion engine.

What we claim is:

1. An internal combustion engine comprising: a cylinder, a cylinder head cooperating with said cylinder to define a main combustion chamber, an intake valve having a valve stem and a valve head connected thereto, a suction port for introducing a lean air-fuel mixture to said main combustion chamber, a trap chamber disposed in said cylinder head for receiving a rich mixture to provide a torch jet ignition and having at least one suction aperture through which the rich mixture is supplied into said trap chamber when said intake valve is opened, said trap chamber also having at least one discharge aperture, all of said suction and discharge apertures being small enough to effect the torch jet ignition, said suction and discharge apertures always being in communication with said main combustion chamber during the time when said intake valve is kept closed so that the torch jet can spurt through said both apertures, and so that during the compression stroke, the pressure at said suction and said discharge aperture is substantially equal thereby preventing a substantial portion of said rich mixture received in said trap chamber from escaping therefrom, a spark plug having a set of electrodes exposed to said trap chamber, a suction passage for feeding the rich mixture to said suction port, said passage having an open end disposed in said suction port so that the rich mixture is introduced therefrom into said trap chamber when said intake valve is opened, and means provided between said suction and discharge apertures in said trap chamber for partially dividing said trap chamber thereby facilitating the introduction of the rich mixture through said suction aperture to said set of electrodes and holding said mixture thereat.

2. An internal combustion engine according to claim 1, wherein said trap chamber includes a side wall portion extending between said suction and discharge apertures of said trap chamber, the periphery of said valve head being disposed in adjacent relationship with said side wall portion when said intake valve is in its open position.

3. An internal combustion engine according to claim 1, wherein said partially dividing means comprises a wall disposed within said trap chamber.

4. An internal combustion engine according to claim 1, wherein said partially dividing means has an end portion extending into said main chamber.

5. An internal combustion engine according to claim 1, wherein said open end of said passage is so positioned in said suction port as to be opened and closed by the back face of said valve head.

6. An internal combustion engine according to claim 1, wherein said passage is provided between its ends with a shut-off valve formed by said valve stem.

7. An internal combustion engine according to claim 2, wherein said side wall portion has an arcuate shape in cross-section substantially complementary to the periphery of said valve head and extends in a direction substantially parallel to the direction of the reciprocal motion of said intake valve.

8. An internal combustion engine according to claim 1, wherein said spark plug has its electrodes disposed at a location adjacent to one of said suction and discharge apertures of said trap chamber.

9. An internal combustion engine according to claim 1, wherein said trap chamber extends into said main chamber.

10. A torch ignition internal combustion engine comprising:
   a cylinder,
   a piston,
   a cylinder head secured to said cylinder and defining in combination with said piston and cylinder a combustion chamber,
   a suction port in communication with said combustion chamber for introducing a lean air-fuel mixture thereto,
   an intake valve disposed in said suction port and comprising a valve head and a valve stem integrally associated therewith,
   a suction passage having an open end thereof disposed within said suction port in the vicinity of said valve head for introducing a rich air-fuel mixture,
   a pot opening into said combustion chamber, said pot having at least one suction aperture for receiving said rich air-fuel mixture and at least one discharge aperture, said pot being entirely closed except for said suction and said discharge apertures, said suction and said discharge apertures generating at least two torches passing through said suction and discharge apertures to burn said lean air-fuel mixture in said combustion chamber,
   an ignition plug having a set of electrodes, said electrodes being received in said pot, and
   a wall means positioned between said suction and said discharge apertures and extending into said pot for directing said rich air-fuel mixture toward said set of electrodes to scavenge residual gases from said pot when said rich air-fuel mixture is delivered to said suction port.

11. A torch ignition internal combustion engine comprising:
   a cylinder,
   a cylinder head cooperating with said cylinder to define a combustion chamber,
   a suction port in communication with said combustion chamber for introducing a lean air-fuel mixture thereto,
   an intake valve disposed in said suction port and comprising a valve head and a valve stem integrally associated therewith,
   a suction passage having an open end thereof disposed within said suction port in the vicinity of said valve head for introducing a rich air-fuel mixture,
   a cylindrical body having a first closed end exposed to said combustion chamber and defining therein a pot, said pot having at said first closed end at least one suction aperture in communication with said combustion chamber for receiving said rich air-fuel mixture and at least one discharge aperture in communication with said combustion chamber, said rich air-fuel mixture being introduced to said pot through said suction aperture when said intake valve is open, said suction and discharge apertures forming at least two torches passing through said apertures to burn said lean air-fuel mixture in said combustion chamber when said rich air-fuel mixture is ignited in said pot,
   a partition protruding inwardly of said pot and being disposed between said suction and said discharge apertures to form a continuous path within said pot to communicate said suction aperture at one end with said discharge aperture at the other end, and
   an ignition plug having a set of electrodes, said ignition plug being disposed outside said pot proximate to said cylindrical body, said cylindrical body further having a side aperture formed therein to provide communication between said set of electrodes and said pot, wherein said rich air-fuel mixture scavenges said pot during the suction process of said engine by filling space formerly occupied by residual gases produced during the combustion process of said engine and sucked out through said discharge aperture during the suction process of said engine.

12. A torch ignition internal combustion engine comprising:
   a cylinder,
   a piston,
   a cylinder head, said cylinder and cylinder head defining a main combustion chamber,
   a suction port in communication with said combustion chamber for introducing a lean air-fuel mixture thereto,
   an intake valve disposed in said suction port and comprising a valve head and a valve stem integrally associated therewith,
   a pot disposed in said cylinder head and having first and second apertures in communication with said combustion chamber,
   means disposed within said suction port in the vicinity of said valve head for introducing a rich air-fuel mixture into said pot through said first aperture,
   an ignition plug having a set of electrodes disposed in said pot, said first and second apertures being small enough to effect a torch jet ignition through said first and second apertures during the ignition cycle of said engine, and
   a wall member disposed in said pot between said first and second apertures, said wall member protruding inwardly of said pot to retain a substantial portion of said rich mixture received therein during the compression cycle, said rich air-fuel mixture effectively scavenging said trap chamber during the suction process of said engine by filling space formerly occupied by residual gases produced in the previous combustion process so that said set of electrodes are surrounded by said rich air-fuel mixture when an ignition spark is generated by said set of electrodes.

13. A torch ignition internal combustion engine comprising:
a cylinder,
a piston,
a cylinder head, said cylinder, piston and cylinder head defining a main combustion chamber,
a suction port in communication with said combustion chamber for introducing a lean air-fuel mixture thereto,
an intake valve disposed in said suction port and comprising a valve head and a valve stem integrally associated therewith,
a pot disposed in said cylinder head and having first and second apertures in communication with said combustion chamber,
means disposed within said suction port in the vicinity of said valve head for introducing a rich air-fuel mixture into said pot through said first aperture,
an ignition plug having a set of electrodes disposed in said pot wherein said set of electrodes are exposed to the path of said rich air-fuel mixture proximate one of said apertures as said mixture flows through said pot from said first aperture to said second aperture, and
a wall member disposed in said pot between said first and second apertures, said wall member protruding inwardly of said pot, said pot retaining a substantial portion of said rich mixture received therein during the compression cycle, said first and second apertures being small enough to form a torch jet ignition through said first and second apertures during the ignition cycle of said engine, said rich air-fuel mixture effectively scavenging said pot during the suction process of said engine by filling space formerly occupied by residual gases produced in the previous combustion process so that said set of electrodes are surrounded by said rich air-fuel mixture when an ignition spark is generated by said set of electrodes.

14. A torch ignition internal combustion engine comprising:
a cylinder,
a piston,
a cylinder head, said cylinder, piston and cylinder head defining a main combustion chamber,
a suction port in communication with said combustion chamber for introducing a lean air-fuel mixture thereto,
an intake valve disposed in said suction port and comprising a valve head and a valve stem integrally associated therewith,
a pot disposed in said cylinder head, said pot having a first aperture for receiving a rich air-fuel mixture and a second aperture having a cross-sectional area small enough to hold said rich mixture in said trap chamber until said rich mixture is ignited,
means disposed in the vicinity of said valve head for introducing a rich air-fuel mixture,
a spark gap disposed within said trap chamber, and
means disposed between said first and second apertures for holding said rich air-fuel mixture in the vicinity of said spark gap until said rich mixture is ignited, said rich air-fuel mixture being introduced into said pot through said first aperture along said holding means to said spark gap thereby scavenging through said second aperture when said intake valve is opened the residual gases produced in the previous combustion process, said first and second apertures effecting a torch jet ignition when said rich air-fuel mixture is ignited.

15. A torch ignition internal combustion engine comprising:
a cylinder,
a piston,
a cylinder head, said cylinder, piston and cylinder head defining a main combustion chamber, a suction port in communication with said combustion chamber for introducing a lean air-fuel mixture thereto,
an intake valve disposed in suction port and comprising a valve head and a valve stem integrally associated therewith,
means disposed in the vicinity of said valve head for introducing a rich air-fuel mixture,
a pot formed in said cylinder head,
means for separating said pot into a first room having a first aperture and a second room having a second aperture, said pot having enough volume to hold therein enough quantity of said rich air-fuel mixture to ignite said lean mixture in said combustion chamber by forming a torch jet through said first and second apertures, said first and second rooms communication with one another within said pot at a position remote from said first and second apertures, said first and second rooms communicating with said main combustion chamber through said first and second apertures, respectively, said rich air-fuel mixture being introduced into said pot through said first aperture into said first room whereby said rich air-fuel mixture flows from said first room to said second room to effectively scavenge through said second aperture into said main combustion chamber residual gases produced in the previous combustion cycle when said intake valve is opened, said second aperture being small enough to hold said rich air-fuel mixture in said pot until said rich air-fuel mixture is ignited, and
a spark gap exposed to said pot so that said spark gap is surrounded by said rich air-fuel mixture when an ignition spark is generated thereacross.

16. A torch ignition internal combustion engine comprising:
a cylinder,
a piston,
a cylinder head secured to said cylinder and defining in combination with said piston and cylinder a combustion chamber,
a suction port in communication with said combustion chamber for introducing a lean air-fuel mixture thereto,
an intake valve disposed in said suction port and comprising a valve head and a valve stem integrally associated therewith,
a suction passage having an open end thereof disposed within said suction port in the vicinity of said valve head for introducing a rich air-fuel mixture, a pot-shaped cavity opening into said combustion chamber for retaining said rich air-fuel mixture therein, said cavity having at least one suction aperture for receiving said rich air-fuel mixture and at least one discharge aperture, said cavity being entirely closed except for said suction and said discharge apertures, said suction and said discharge apertures forming at least two torches which pass therethrough to burn said lean air-fuel mixture in said combustion chamber when said rich air-fuel mixture in said cavity is ignited, an ignition plug having a set of electrodes, said electrodes being received in said cavity, and a wall means positioned between said suction and said discharge apertures and extending into said cavity for directing said rich air-fuel mixture toward said set of electrodes to scavenge residual gases from about said electrodes through said discharge aperture when said rich air-fuel mixture is delivered to said suction port.

17. A torch ignition internal combustion engine comprising:

a cylinder, a piston, a cylinder head secured to said cylinder and defining in combination with said piston and cylinder a combustion chamber, a suction port in communication with said combustion chamber for introducing a lean air-fuel mixture thereto, an intake valve disposed in said suction port and comprising a valve head and a valve stem integrally associated therewith, a suction passage having an open end thereof disposed within said suction port in the vicinity of said valve head for introducing a rich air-fuel mixture, a pot-shaped cavity opening into said combustion chamber for retaining said rich air-fuel mixture therein, said pot-shaped cavity including first aperture means for receiving said rich air-fuel mixture and for forming a torch jet for burning said lean air-fuel mixture in said main combustion chamber during a combustion cycle of said engine, and second aperture means for discharging the residual exhaust gases from said cavity to effect the scavenging of said residual gases from said cavity and for forming a second torch jet for burning said lean air-fuel mixture in said main combustion chamber during the combustion cycle of said engine, an ignition plug having a set of electrodes, said electrodes being received in said cavity, and a wall means positioned between said first and second means and extending into said cavity for directing said rich air-fuel mixture toward said set of electrodes to scavenge residual gases from about said electrodes through said second means when said rich air-fuel mixture is delivered to said suction port.

18. A torch ignition internal combustion engine comprising:

a cylinder, a piston, a cylinder head secured to said cylinder and defining in combination with said piston and cylinder a combustion chamber, a suction port in communication with said combustion chamber for introducing a lean air-fuel mixture thereto, an intake valve disposed in said suction port and comprising a valve head and a valve stem integrally associated therewith, a suction passage having an open end thereof disposed within said suction port in the vicinity of said valve head for introducing a rich air-fuel mixture, a pot-shaped cavity opening into said combustion chamber for retaining said rich air-fuel mixture therein, said pot-shaped cavity including first means for receiving said rich air-fuel mixture and for forming a torch jet for generating burning turbulence of said lean air-fuel mixture in said main combustion chamber to thereby substantially burn all of said lean air-fuel mixture therein, and second means for discharging the residual exhaust gases from said port to effect the scavenging of said gases from said cavity and for forming a torch jet for generating burning turbulence in said lean air-fuel mixture in said main combustion chamber to thereby substantially burn all of said mixture therein, an ignition plug having a set of electrodes, said electrodes being received in said cavity, and a wall means positioned between said first and second means and extending into said cavity for directing said rich air-fuel mixture toward said set of electrodes to scavenge residual gases from about said electrodes through said first and second means when said rich air-fuel mixture is delivered to said suction port.

* * * * *